(No Model.)

G. P. RIESTER.
WAGON BRAKE LEVER.

No. 321,315. Patented June 30, 1885.

Witnesses:
Edward Fenwick
B. L. Fenwick

Inventor
George P. Riester
by his atty,
Fenwick and Lawrence

UNITED STATES PATENT OFFICE.

GEORGE P. RIESTER, OF SALEM, INDIANA.

WAGON-BRAKE LEVER.

SPECIFICATION forming part of Letters Patent No. 321,315, dated June 30, 1885.

Application filed May 14, 1885. (No model.)

*To all whom it may concern:*

Be it known that I, GEORGE P. RIESTER, a citizen of the United States, residing at Salem, in the county of Washington and State of Indiana, have invented a new and useful Improvement in Wagon-Brakes, of which the following is a specification.

My invention consists, first, in the peculiar construction and combination of the hand-lever, spring-acted thumb-lever, connecting-pitman, pawl, locking bar and slide, to which the brake-rod is connected, whereby great simplicity is secured, and a very efficient and improved wagon-brake is produced; and, second, it consists in certain peculiar constructions and combinations, as hereinafter described, and specifically claimed.

Figure 1:
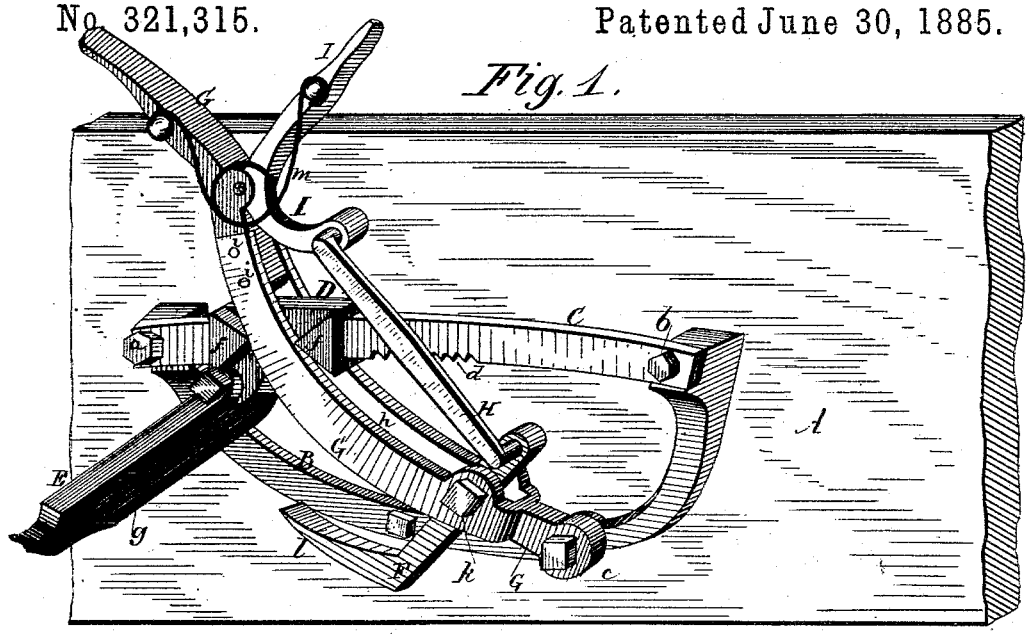
Figure 2:
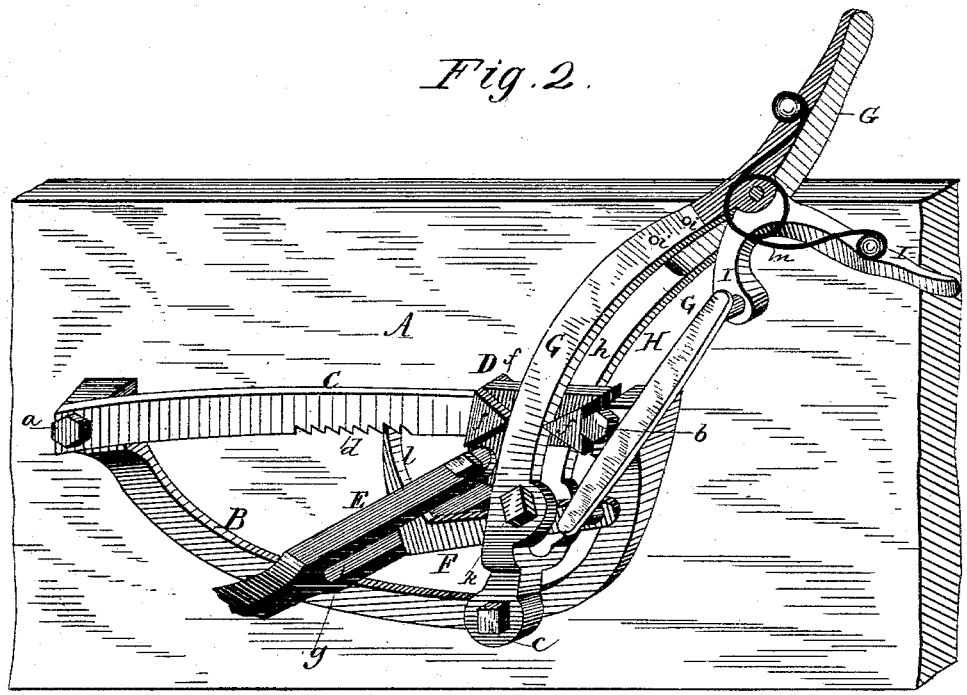

In the drawings, Figure 1 is a perspective view of my improved wagon-brake-operating mechanism as it appears when the brake is out of action, or its rod, to which the brake shoe or block is attached, is moved so as to draw the shoe away from the wheel of the wagon; and Fig. 2 is a similar view of the same as it appears when the parts have been adjusted for causing the brake to come into action upon the wheel of a wagon.

A in the drawings may represent a portion of a wagon-body or other vehicle.

B is a curved iron supporting bar or bracket adapted to be fastened by bolts $a$, $b$, and $c$ to the body A, it having suitable holes for the passage of the bolts through it. To the upper ends of this iron bar a slightly-curved locking-bar, C, is fastened by the bolts $a$ and $b$, and on the under side of this bar beveled locking-notches $d$ are provided.

D is a slide fitted loosely upon the bar C by means of an oblong passage, which extends entirely through it. On each side of this slide two V-shaped projections, $f$, are constructed or cast, and between these projections spaces $f'$, of the shape shown, are formed.

E is the brake-rod, which may be connected in the usual manner to any suitable brake shoe or block. This rod is slotted, as at $g$, so that the locking-pawl F may work through it, as will be presently described.

G is a curved lever for operating the brake. This lever has its fulcrum on the bolt $c$, by which the supporting bar or bracket B is fastened to the wagon-body, and it is constructed with a long slot, $h$, between its lower and upper solid end portions. The upper end portion may be made separate from the intermediate portion, and bolted thereto, as shown at $i$, while the lower solid portion may be formed with the solid intermediate portion. Within the slot $h$ the slide D is fitted loosely, while the curved side pieces of the intermediate portion of the lever G are fitted loosely between the V-shaped projections $f$ of the slide, as represented. The slide, thus coupled with the lever, will be caused to travel freely on the bar C when the lever is moved either forward or backward, as is made manifest by the two views of the drawings.

Between the bars B and C the pawl F is pivoted at $k$ to the lever G. This pawl is of angular form, and its end $l$, which is beveled, fits into one or the other of the beveled locking-notches $d$ of the bar C, as illustrated in Fig. 2, when the brake is in action upon a wheel of a wagon or other vehicle, and it occupies a position, as shown in Fig. 1, when the brake is out of action.

H is a pitman connected by one end to the heel end of the pawl and by its other end to the short arm of an elbow thumb-lever, I, to which is pivoted the main lever G, and provided with a coiled spring, $m$, whereby it is caused to keep the pawl in its locked position, as shown in Fig. 2.

To operate the brake mechanism so as to release the brake-shoe, the thumb or finger is placed upon the lever I, and the pawl forced out of the notch which retains it. The lever G is then moved from the position shown in Fig. 2 to that shown in Fig. 1. This movement of the lever causes the slide D to move on the bar C, and thereby move the rod E with the brake-shoe a long distance away from the wagon-wheel. During the movement of the slide the pawl F clears the rod E by playing in the slot $g$ of said rod. When it is desired to apply the brake, the lever G is grasped with the hand and moved back to the position shown in Fig. 2, and as the lever is thus moved, the pawl, without being acted upon by the finger on the thumb-lever, glides over the bevel locking-notches $d$, and finally seats itself into one of the notches and locks the brake mechanism, this taking place when the lever has arrived at the desired position.

By my invention the distance from the fulcrum of the lever to the locking-bar is greatly reduced, and the expense for a heavy and large metal supporting-bar B which affords a much greater sweep than the one shown, is avoided, while the amount of clearance secured between the wagon-wheel and the brake shoe or block from a given length of lever is not decreased, but rather increased. My invention also renders the brake mechanism very certain and positive in its action, convenient of application to the wagon-body, and simple in its construction. The lever does not require the aid of a spring in the operation of applying the brake shoe or block to the wheel.

What I claim is—

1. The combination of the hand-lever G, spring-acted thumb-lever I, connecting-pitman H, pawl F, pivoted to the hand-lever, locking-bar C, having notches $d$, and brake-rod slide D, substantially as and for the purpose described.

2. The slide D, of the brake mechanism, having a passage entirely through it, and provided with separated V-shaped projections on its sides, in combination with the bar C, and lever G, having slot $h$, substantially as and for the purpose described.

GEORGE P. RIESTER.

Witnesses:
JAMES B. BERKEY,
DEMPSEY V. B. MOTSINGER.